(12) United States Patent
Laserra Lima

(10) Patent No.: US 11,742,957 B1
(45) Date of Patent: Aug. 29, 2023

(54) GLASS PANEL AS HIGH-SPEED OPTICAL INTERCONNECT

(71) Applicant: GM GLOBAL TECHNOLOGY OPERATIONS LLC, Detroit, MI (US)

(72) Inventor: Thiago Laserra Lima, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/725,709

(22) Filed: Apr. 21, 2022

(51) Int. Cl.
*H04B 10/80* (2013.01)
*B60J 1/20* (2006.01)

(52) U.S. Cl.
CPC .............. *H04B 10/801* (2013.01); *B60J 1/20* (2013.01)

(58) Field of Classification Search
None
See application file for complete search history.

(56) References Cited

U.S. PATENT DOCUMENTS

| 2004/0042233 A1* | 3/2004 | Suzuki | G02B 6/0038 |
| | | | 362/606 |
| 2009/0002627 A1* | 1/2009 | Katz | G02C 7/14 |
| | | | 359/742 |

FOREIGN PATENT DOCUMENTS

| CN | 2518740 Y | * | 10/2002 |
| EP | 0866330 A2 | * | 9/1998 |
| EP | 0947403 A2 | * | 10/1999 |

* cited by examiner

*Primary Examiner* — Darren E Wolf
(74) *Attorney, Agent, or Firm* — CANTOR COLBURN LLP (57) ABSTRACT

Aspects of the disclosure include equipment and process schemes for using a glass panel of a vehicle as a high-speed optical interconnect. An exemplary method can include forming a first insert in a first region of a glass panel of a vehicle and a second insert in a second region of the glass panel. A light emitter can be placed on a surface of the first insert. A light receiver can be placed on a surface of the second insert. The method can include injecting, by the light emitter, light into the first insert. The method can include receiving, by the light receiver, the light at the surface of the second insert.

19 Claims, 4 Drawing Sheets

GLASS PANEL AS HIGH-SPEED OPTICAL INTERCONNECT

INTRODUCTION

The subject disclosure relates to automotive data communication and telematics, and particularly to using a glass panel (e.g., windshield glass) as a high-speed optical interconnect by leveraging the lightguide properties of glass.

The number of control functions and control objects required in a motor vehicle has rapidly increased to satisfy the increasing power and data requirements for ever more sophisticated in-vehicle data communication systems. Communication systems increasingly rely upon a greater number and variety of sensors, cameras, and the like to enhance the driver experience.

Typically, one or more electronic control units (ECUs) manages data communication between the various sensors, cameras, and other control objects (e.g., engine and exhaust system ECU(s), etc.) of the in-vehicle data communication system. To accommodate a greater number of control objects, the number of terminals (inputs/outputs) of the ECU has increased, leading to larger and more complex ECU designs. Moreover, the number of physical connections (wires) required between the ECUs and the various control objects has similarly increased.

The ECU(s) are typically located at or below the dashboard, while the control objects of the in-vehicle data communication systems can be located arbitrarily throughout the vehicle. For example, control objects can be found on the roof, at the wheelbase, at or near the rear-view mirror, etc. A wiring harness is used to route the connections between the ECU(s) and the control objects which are located above the dashboard. The wiring harness usually routes through the A-pillar of the vehicle frame.

SUMMARY

In one exemplary embodiment, a method includes using a glass panel of a vehicle as a high-speed optical interconnect. The method can include forming a first insert in a first region of a glass panel of a vehicle and a second insert in a second region of the glass panel. A light emitter can be placed on a surface of the first insert. A light receiver can be placed on a surface of the second insert. The method can include injecting, by the light emitter, light into the first insert. The method can include receiving, by the light receiver, the light at the surface of the second insert.

In addition to one or more of the features described herein, the glass panel can be configured such that the light passes between the first insert and the second insert in a direction parallel to a major surface of the glass panel.

In some embodiments, the first insert and the second insert each comprise a polished transparent material having a surface variation of less than 3 percent.

In some embodiments, forming the first insert and/or the second insert includes forming a polished groove in the glass panel and inserting or otherwise placing the respective insert into the polished groove.

In some embodiments, forming the first insert includes molding the first insert into the glass panel during manufacture of the glass panel.

In some embodiments, an end of the first insert and/or the second insert terminates within the glass panel at a depth of 10 to 90 percent a thickness of the glass panel.

In some embodiments, the light emitter defines a portion of a communication hub on the surface of the first insert and the light receiver defines a portion of a control object on the surface of the second insert. In some embodiments, the control object comprises one or more of a camera, a display, a rain sensor, an air quality sensor, a driver monitor, a passenger monitor, and a microphone.

In some embodiments, the communication hub uses the glass panel as an optical communication layer to exchange data with the control object. In some embodiments, the communication hub negotiates with the control object to communicate over the optical communication layer at a defined wavelength or frequency of light.

In another exemplary embodiment a system is configured to use a glass panel of a vehicle as a high-speed optical interconnect. The system includes a first insert formed in a first region of the glass panel of the vehicle and a second insert formed in a second region of the glass panel of the vehicle. The system further includes a light emitter positioned on a surface of the first insert. The light emitter is configured to inject light into the first insert. The system further includes a light receiver positioned on a surface of the second insert. The light receiver is configured to receive the light at the surface of the second insert.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, the development of sophisticated in-vehicle data communication systems is necessary to meet the demands of the automotive industry. To enhance the driver experience, an ever-increasing number and variety of sensors, cameras, and the like are employed throughout the vehicle. In-vehicle data communication systems must adapt to keep up with the increasing power and data requirements of these control objects (also referred to as modules).

Some challenges for in-vehicle data communication systems include data and communication routing. Each control object must have means to communicate with other vehicle systems, such as the ECU(s), typically via data cables and low and high-power wiring. For example, a rain sensor needs a data path to its respective ECU so that measured rain levels can be provided for windshield wiper control, etc. The locations where the ECUs and control objects are located can be dispersed throughout the vehicle. Consequently, routing has become more complicated as the number of the control objects has increased and their location throughout the vehicle has dispersed. For example, the number of data cables and low and high-power wires and their distances to their respective ECU(s) have generally increased.

The wiring harness has become progressively larger to accommodate the increasing number of power and data connections of the in-vehicle data communication system. To fit these larger wiring harness, the vehicle pillars (e.g., A-pillar) are facing similar scaling issues, as a larger pillar is needed to accommodate the wiring harness. Manufacturers prefer, however, flexibility in providing a smaller pillar to improve the customer experience. For example, a smaller A-pillar enables a wider front windshield.

Rather than continually increasing the size and complexity of the wiring harness, embodiments described herein leverage the natural lightguide properties of glass to use one or more windows (e.g., the front or rear windshield glass, side windows, sunroof, etc.) as a high-speed optical interconnect. In some embodiments, various control objects are attached or otherwise coupled to the window and high-speed optical communication with a remote communication hub (communication gateway, ECU, etc.) is made through the window in a direction parallel to the major surface of the window. In this manner the front windshield glass (or any other glass in the vehicle) can replace one or more data cables of the in-vehicle data communication system, alleviating size constraints on the wiring harness. In particular, the wiring harness can be greatly simplified as only power would need to be gated (e.g., to the roof) via the wiring harness.

Technical solutions described herein facilitate a range of improvements to automotive and data communication technology. As an initial matter, modifying the in-vehicle data communication system to leverage the lightguide properties of glass allows for the utilization of various glass elements within the vehicle (e.g., front windshield, rear glass, etc.) as a layer of information transfer to enable a highspeed link on all devices that are glass attached. In addition, such a configuration allows for the placement of control objects without worrying about their impact on the wiring harness. Moreover, control objects can be placed in locations which are otherwise infeasible due to wiring harness access difficulties. For example, locations where a wiring harness cannot service, where manufacturing a wiring harness to service the location would be prohibitively complicated or expensive, or where sizing considerations for the respective wiring harness cannot satisfy pillar width design targets.

Other technical advantages are possible. In some embodiments, a centralized communication hub is positioned on the glass to send and receive data from a plurality of control objects (also positioned on the glass). The communication hub can use a mixture of light frequencies and wavelengths (e.g., color, visible light, infrared light, etc.) to provide redundancy and interference protection. In some embodiments, the communication hub uses a different light characteristic (e.g., frequency, wavelength, etc.) for each control object, allowing for simultaneous communication to several control objects at the same time. Additionally, using glass as a high-speed optical interconnect allows for higher bandwidth peripherals as those data connections are no longer gated by cable limitations.

Figure 1:
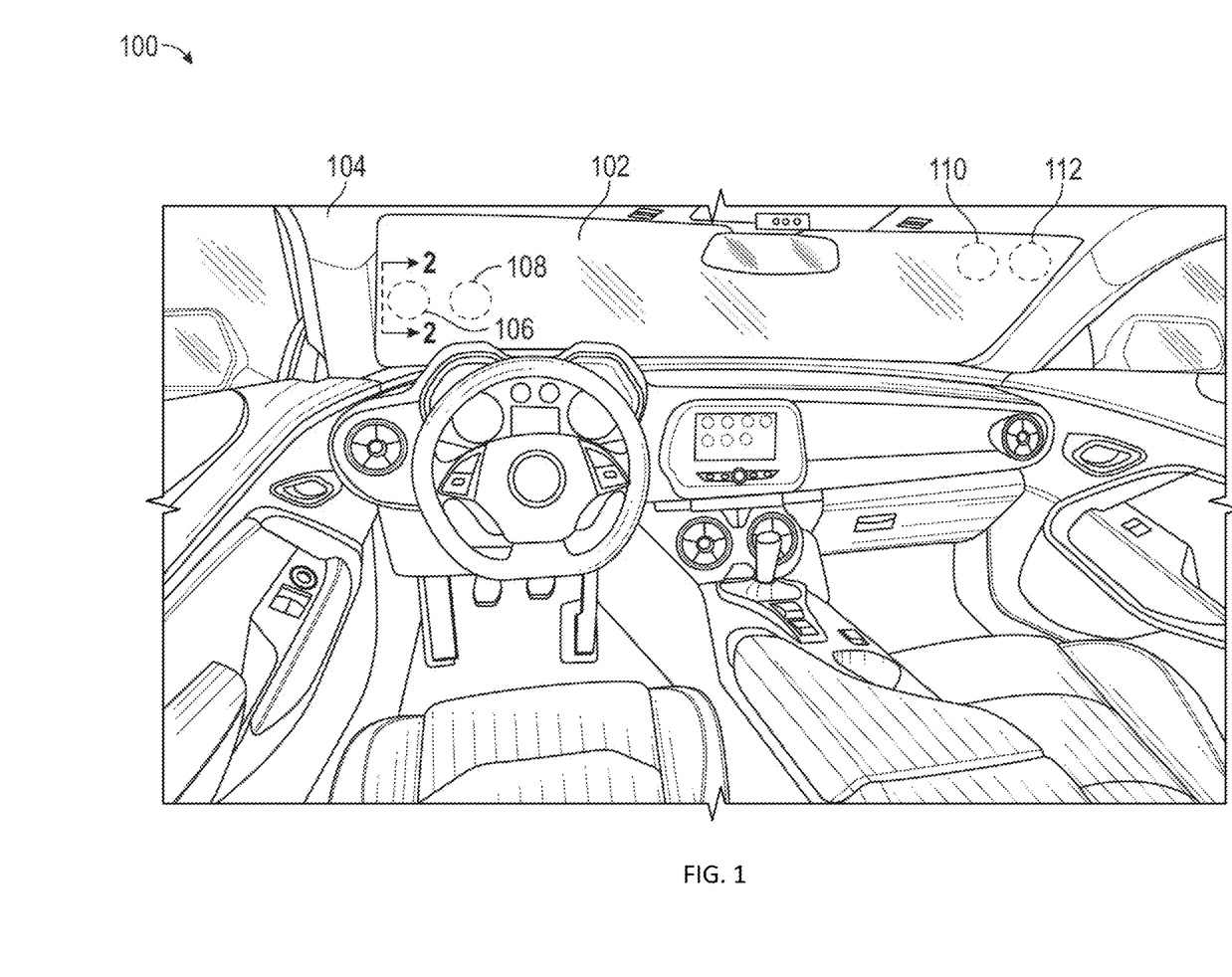
FIG. 1 depicts a vehicle configured to use glass as a high-speed optical interconnect by leveraging the lightguide properties of glass according to one or more embodiments.

FIG. 1 illustrates a vehicle 100 configured to use glass 102 (e.g., front windshield glass) as a high-speed optical interconnect by leveraging the lightguide properties of glass according to one or more embodiments. As shown in FIG. 1, the vehicle 100 can include a frame 104 configured to house the glass 102. The frame 104 can include, for example, the roof, front bulkhead, and various pillars (e.g., A-pillar) of the vehicle 100.

The vehicle 100 further includes a communication hub 106 and one or more control objects (e.g., control objects 108, 110, 112). The number, size, and relative position of each of the control objects 108, 110, 112 on the glass 102 is provided for ease of discussion and illustration only and is not meant to be particularly limited. In various embodiments the number, size, and/or location of the control objects can differ. Moreover, in some embodiments, the vehicle 100 includes two or more communication hubs (e.g., communication hub 106 and one or more additional hubs, not separately shown).

The communication hub 106 can be a high-speed optical gateway with integration to one or more vehicle networks (e.g., remote ECUs, processors, etc., not separately shown). In some embodiments, the communication hub 106 includes direct wiring to the one or more vehicle networks. In some embodiments, the communication hub 106 is configured with an emitter and a receiver for optical communication across the glass 102. A more detailed description of the communication hub 106 is described with respect to FIG. 2.

The control objects 108, 110, 112 can include any number of sensors, cameras, and other high-speed or high-bandwidth accessories (driver and/or passenger health or alertness monitors, air quality monitors, air conditioning and/or vent controllers, etc.). The type and functionality of the control objects 108, 110, 112 is not meant to be particularly limited and can include accessories currently available or developed in the future.

In some embodiments, the control objects 108, 110, 112 serve the same general functionality (e.g., a driver monitor and a passenger monitor, etc.). In some embodiments, each of the control objects 108, 110, 112 serves a different function for the vehicle 100. For example, the control object 108 can include a rear-view camera screen, the control object 110 can include a rain sensor, and the control object 112 can include an air quality monitor. Other control objects (not separately shown) can include, for example, a microphone for measuring ambient noise levels.

In some embodiments, each of the control objects 108, 110, 112 is configured with an emitter and a receiver for optical communication across the glass 102. In this manner, data collected from the control objects 108, 110, 112 can be utilized by remote systems (ECUs, processors, etc., not separately shown) of the vehicle 100 for control decisions. For example, ambient noise levels measured from a microphone can be used by a remote ECU to compensate (increase or decrease) radio or phone sound levels. Air quality data can be used by a remote ECU to enable air recycling (i.e., closing the air system). A more detailed description of the control objects 108, 110, 112 is described with respect to FIG. 2.

In some embodiments, the communication hub 106, the control objects 108, 110, 112, and the remote systems (e.g., ECUs) of the vehicle 100 collectively define all or part of a comprehensive in-vehicle data communication system (not separately shown). The in-vehicle data communication system can further include the various data and power connections (wiring, wiring harnesses, etc.) required to communicatively couple the communication hub 106, the control objects 108, 110, 112, and the remote systems.

Figure 2:
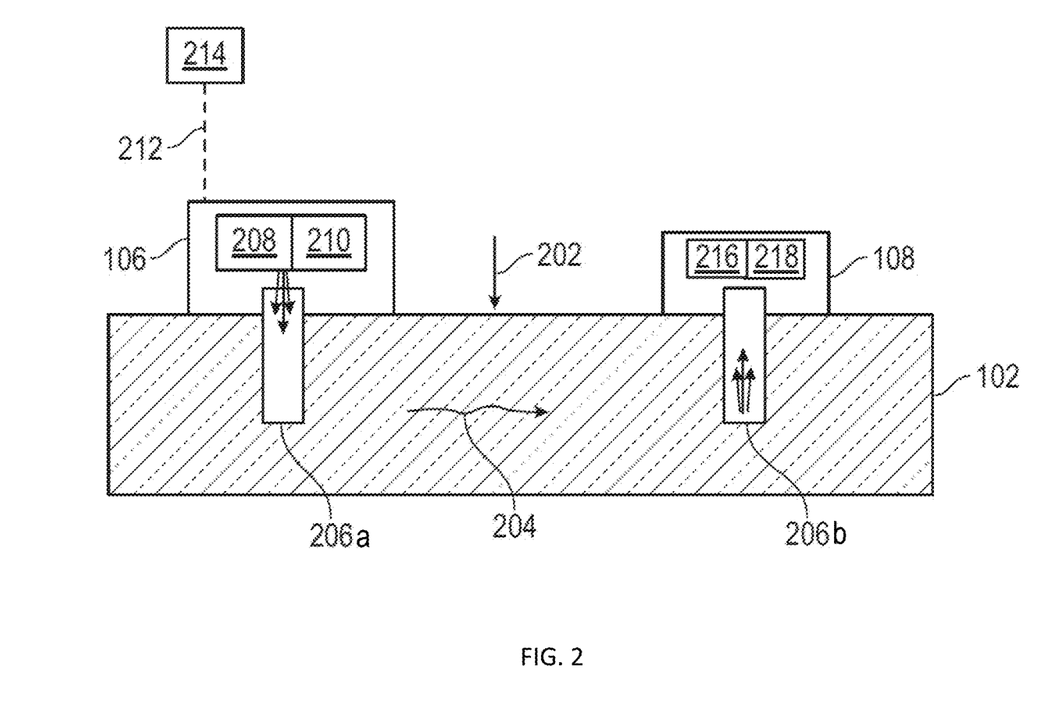
FIG. 2 is a section view of the glass of the vehicle shown in FIG. 1.

FIG. 2 illustrates a section view of the glass 102 of the vehicle 100 shown in FIG. 1. As shown in FIG. 2, the relative positions between the communication hub 106 and the control objects (e.g., control object 108) on the glass 102 have been modified for ease of discussion. As further shown in FIG. 2, the glass 102 includes a major surface 202 and a light path 204 that runs below and parallel to the major surface 202.

To leverage a glass panel (e.g., the glass 102) as a lightguide, one or more highly polished inserts (e.g., inserts 206a, 206b) are placed within the glass 102 at an angle perpendicular to the major surface 202. The inserts 206a, 206b can be made from any material suitable for light transmission, such as, for example, glass, plastic, etc. (i.e., a wholly or partially transparent material). As used herein, a highly polished insert refers to an insert which is polished until the surface has a roughness average (Ra) between 0.0025 and 0.2 micrometers (i.e., variation as measured from a mean height).

The inserts 206a, 206b can be molded or otherwise incorporated within the glass 102 during manufacture of the glass 102. Alternatively, the inserts 206a, 206b can be inserted within the glass 102 after manufacture of the glass 102. Advantageously, multiple inserts can be pre-fabricated at arbitrary locations of the glass 102 to serve as later "plug and play" attachment points. In some embodiments, one or more grooves (not separately shown) are formed in the glass 102 and polished prior to installation of the inserts 206a, 206b.

In some embodiments, the inserts 206a, 206b are placed, molded, or otherwise formed at a depth of roughly 50% the thickness of the glass 102 (i.e., terminating rough half-way through the glass 102), although other configurations are within the contemplated scope of the disclosure. In some embodiments, the inserts 206a, 206b are placed, molded, or otherwise formed at a depth of roughly 10%, 20%, 30%, 40%, 50%, 60%, 70%, 80%, or 90% the thickness of the glass 102 (as measured from the topmost surface). In some embodiments, one or more of the inserts 206a, 206b are positioned directly against a sidewall of the glass 102 rather than within a groove. In still other embodiments, one or more of the inserts 206a, 206b are placed, molded, or otherwise formed below a surface of the sidewall of the glass 102.

As discussed previously, the inserts 206a, 206b serve as attachment points for the various control objects (e.g., the control objects 108, 110, 112) and communication hubs (e.g., the communication hub 106). In some embodiments, the communication hub 106 and the control object 108 are attached to the inserts 206a and 206b, respectively (as shown in FIG. 2).

In some embodiments, the communication hub 106 includes an emitter 208 configured to inject light into the glass 102 via the insert 206a. In some embodiments, the emitter 208 is a high-power light emitter, such as an LED emitter, or of a same or similar type of light emitter as used for fiber optics. In some embodiments, the communication hub 106 further includes a receiver 210 configured to receive light via the insert 206a. In this manner two-way optical communication can be made via the insert 206a through the glass 102. In some embodiments, the emitter 208 and the receiver 210 are separate modules within the communication hub 106. In some embodiments, the emitter 208 and the receiver 210 are incorporated within the same module within the communication hub 106.

In some embodiments, the communication hub 106 is communicatively coupled via wiring 212 to one or more remote ECU(s) (e.g., processors 214) of an in-vehicle data communication system (not separately shown) of the vehicle 100. In this manner the communication hub 106 serves as a gateway or middleman for communication between the various control objects 108, 110, 112 and the processors 214. In some embodiments, the communication hub 106 and/or the processors 214 can be positioned such that a wiring harness is not required between the communication hub 106 and the processors 214. In this configuration the communication hub 106 can include an optical connection to the processors 214 and to the various control objects (e.g., control object 108) on the glass 102. In other embodiments, the communication hub 106 is provided a direct wired connection to the processors 214 either via a wiring harness or as a simple wired connection without a full harness. In this configuration the communication hub 106 has a direct wired connection to the processors 214 and an optical connection to the various control objects (e.g., control object 108) on the glass 102.

In some embodiments, the control objects (e.g., control object 108) each include an emitter 216 and a receiver 218, configured in a same manner as the emitter 208 and receiver 210 for two-way optical communication via inserts (e.g., insert 206b) through the glass 102. In some embodiments, the emitter 216 and the receiver 218 are separate modules within the respective control object of the control objects 108, 110, 112. In some embodiments, the emitter 216 and the receiver 218 are incorporated within the same module within the respective control object of the control objects 108, 110, 112.

One advantage of the in-vehicle data communication system described herein is that the described insert and emitter/receiver orientation will not impact the light transfer between both systems (i.e., between the communication hub and its respective sensor or a combination of multiple sensors with a hub between). In particular, the light passing between the communication hub 106 and the control objects 108, 110, 112 is not visible through the glass 102 in a direction orthogonal to the light path 204 (i.e., in the direction of a driver or passenger looking through the glass 102). Instead, the light passing between the communication hub 106 and the control objects 108, 110, 112 is only visible when looking along the edge of the glass 102 due to the light guide properties of any glass.

In some embodiments, the inserts 206a, 206b, the control objects 108, 110, 112, and the communication hub 106 are preinstalled in the glass 102 and preconfigured for communication with the processors 214. In some embodiments, only the communication hub 106 and the insert 206a are preinstalled in the glass 102. In some embodiments, only the inserts (e.g., inserts 206a, 206b) are preinstalled in the glass 102. In this manner the inserts 206a, 206b serve as "plug and play" attachment points that allow for future customizations and upgrades including, for example, the incorporation of advanced accessories that are later developed with only minimal impact.

In some embodiments, installation (attachment) of a control object (e.g., the control object 108) initiates a handshake/authentication process with the communication hub 106 and/or the processors 214. For example, a new control object (e.g., the control object 108) can be installed at an existing, unused insert of the inserts 206a, 206b. Once installed, the control object can exchange handshake/authentication data with the communication hub 106 and/or the processors 214 to establish the optical communication link.

In some embodiments, the handshake/authentication exchange includes a negotiation for communication parameters, such as, for example, required data rates, light characteristics for the optical communication channel (e.g., wavelength, frequency, visible, IR, etc.), active/sleeping communication windows, definitions or parameters that will be passed to or from the control object, etc. In some embodiments, a newly installed control object can request to communicate over a particular light frequency or wavelength and, if available, the communication hub 106 and/or the processors 214 can acknowledge the requested communication medium as an available and accepted communication channel. In some embodiments, the communication hub 106 specifies which wavelengths have data to the newly installed control object.

In some embodiments, the various control objects (e.g., control object 108) and the communication hub 106 communicate over light frequencies or wavelengths specially allocated for accessories, therefore not impacting any OEM default/high priority systems (not separately shown) of the vehicle 100. In some embodiments, each of the control objects (e.g., control objects 108, 110, 112) is assigned a band of light frequencies or wavelengths over which communication is authorized. In this manner each control object can be provided with a dedicated communication channel. In some embodiments, the assigned frequencies or wavelengths partially or wholly overlap with the assigned frequencies or wavelengths of one or more other control objects, if needed or desired for a particular configuration.

To provide redundancy and interference protection, in some embodiments, the various control objects (e.g., control object 108) and the communication hub 106 communicate over a primary optical medium (e.g., red light) as well as one or more secondary or backup optical mediums (e.g., yellow light).

To provide bandwidth flexibility, in some embodiments, the various control objects (e.g., control object 108) and the communication hub 106 communicate over a primary optical medium (e.g., red light), with the option to include additional optical mediums when necessary to satisfy bandwidth considerations (e.g., red light and yellow light). In some embodiments, a control object can be assigned more, or fewer, optical communication channels (mediums) dynamically as the required bandwidth for the respective control object changes over time. For example, a control object can initialize communication with the communication hub 106 over green light, and later, increase bandwidth by communicating over green, red, and yellow light. Bandwidth flexibility can also be employed by progressively assigning control objects to optical mediums which have capacity (e.g., assign control objects to red light until "full" and then start using yellow light, etc.).

Figure 3:
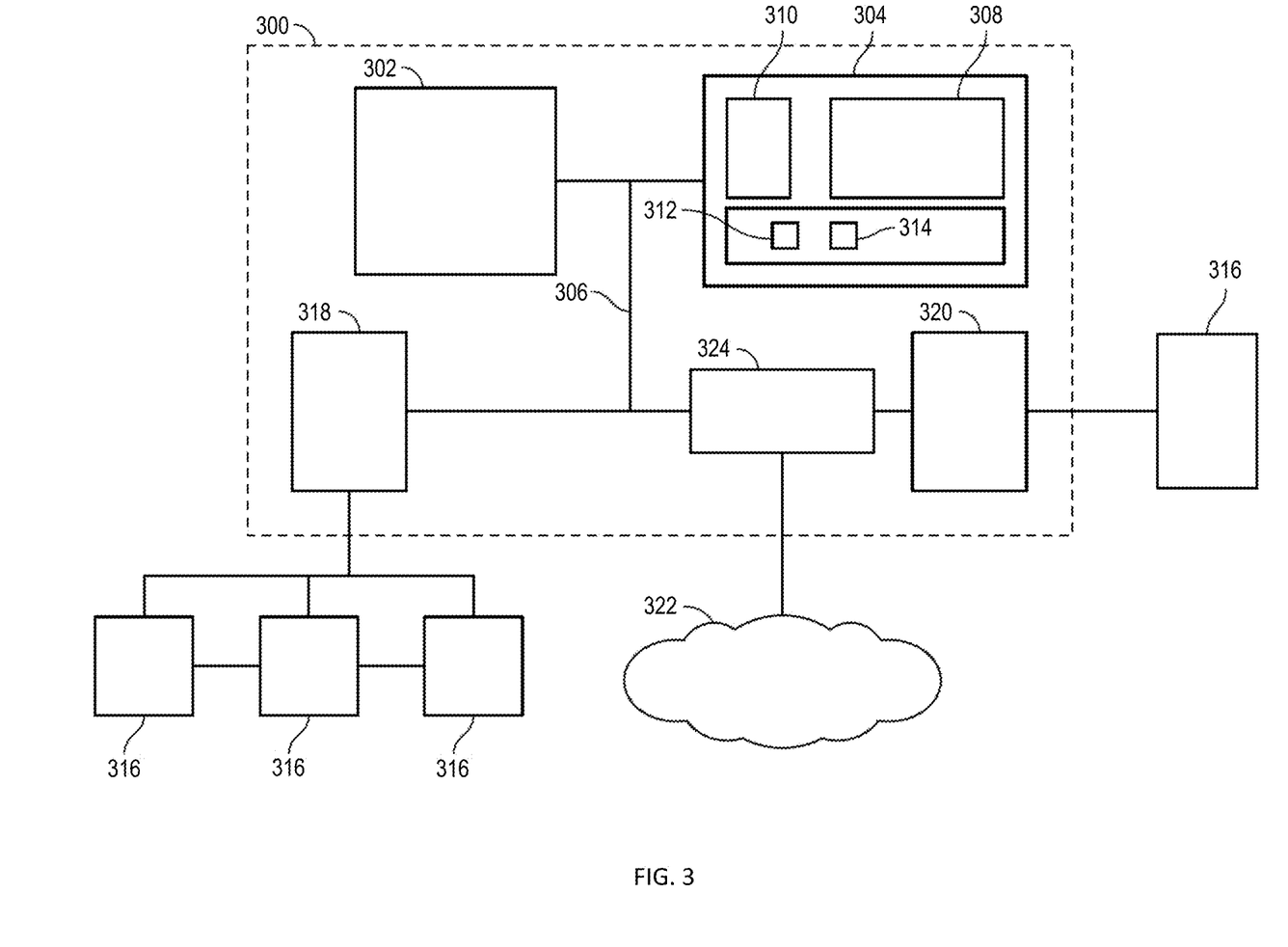
FIG. 3 is a computer system according to one or more embodiments.

FIG. 3 illustrates aspects of an embodiment of a computer system 300 that can perform various aspects of embodiments described herein. In some embodiments, the computer system 300 can be incorporated within one or more of the communication hub 106 and the control objects 108, 110, 112. The computer system 300 includes at least one processing device 302, which generally includes one or more processors for performing aspects of methods described herein.

Components of the computer system 300 include the processing device 302 (such as one or more processors or processing units), a memory 304, and a bus 306 that couples various system components including the system memory 304 to the processing device 302. The system memory 304 may include a variety of computer system readable media. Such media can be any available media that is accessible by the processing device 302, and includes both volatile and non-volatile media, and removable and non-removable media.

For example, the system memory 304 includes a non-volatile memory 308 such as a hard drive, and may also include a volatile memory 310, such as random access memory (RAM) and/or cache memory. The computer system 300 can further include other removable/non-removable, volatile/non-volatile computer system storage media.

The system memory 304 can include at least one program product having a set (e.g., at least one) of program modules that are configured to carry out functions of the embodiments described herein. For example, the system memory 304 stores various program modules that generally carry out the functions and/or methodologies of embodiments described herein. A module or modules 312, 314 may be included to perform functions related to one or more of the control objects 108, 110, 112 and the communication hub 106 such as, for example, acquiring images (e.g., for a camera), controlling windshield wiper speed based on sensor data (e.g., for a rain sensor), etc. The system 300 is not so limited, as other modules may be included depending on the functionality of the respective control objects. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 302 can also be configured to communicate with one or more external devices 316 such as, for example, a keyboard, a pointing device, and/or any devices (e.g., other control objects, the communication hub 106, a network card, a modem, etc.) that enable the processing device 302 to communicate with one or more other computing devices. Communication with various devices can occur via Input/Output (I/O) interfaces 318 and 320.

The processing device 302 may also communicate with one or more networks 322 such as a local area network (LAN), a general wide area network (WAN), a bus network and/or a public network (e.g., the Internet) via a network adapter 324. In some embodiments, the network adapter 324 is or includes an optical network adaptor for communication over an optical network (e.g., optical communication across the glass 102). It should be understood that although not shown, other hardware and/or software components may be used in conjunction with the computer system 300. Examples include, but are not limited to: microcode, device drivers, redundant processing units, external disk drive arrays, RAID systems, and data archival storage systems, etc.

Figure 4:
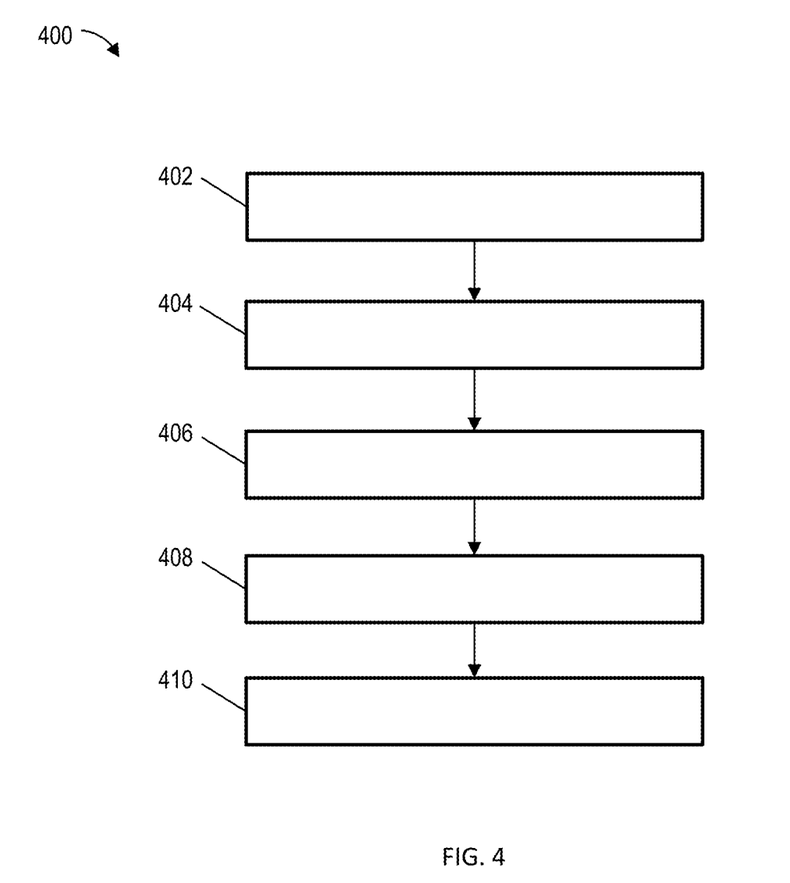
FIG. 4 is a flowchart in accordance with one or more embodiments.

Referring now to FIG. 4, a flowchart 400 for using windshield glass as a high-speed optical interconnect is generally shown according to an embodiment. The flowchart 400 is described in reference to FIGS. 1-3 and may include additional steps not depicted in FIG. 4. Although depicted in a particular order, the blocks depicted in FIG. 4 can be rearranged, subdivided, and/or combined.

At block 402, a first insert is formed in a first region of a glass panel of a vehicle and a second insert is formed in a second region of the glass panel. In some embodiments, the first insert and the second insert each include a polished transparent material having a surface variation of less than 5 percent, or less than 3 percent.

In some embodiments, forming the first insert and/or second insert includes forming a polished groove in the glass panel and inserting or otherwise placing the respective first insert into the polished groove. In some embodiments, forming the first insert and/or second insert includes molding the respective insert with the glass panel as a single monolithic piece during manufacture of the glass panel.

In some embodiments, an end of the first insert and/or the second insert terminates within the glass panel at a depth of 10 to 90 percent a thickness of the glass panel.

At block 404, a light emitter is placed on a surface of the first insert. In some embodiments, the light emitter defines a portion of a communication hub on the surface of the first insert. In some embodiments, the communication hub uses the glass panel as an optical communication layer to exchange data with a control object. In some embodiments, the communication hub negotiates with the control object to communicate over the optical communication layer at a defined wavelength or frequency of light.

At block 406, a light receiver is placed on a surface of the second insert. In some embodiments, the light receiver defines a portion of a control object on the surface of the second insert. In some embodiments, the control object includes one or more of a camera, a display, a rain sensor, an air quality sensor, a driver monitor, a passenger monitor, and a microphone.

At block 408, the light emitter injects light into the first insert.

At block 410, the light receiver receives the light at the surface of the second insert. The light passes between the first insert and the second insert in a direction parallel to a major surface of the glass panel.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method comprising:
   forming a first insert in a first region of a glass panel of a vehicle and a second insert in a second region of the glass panel, wherein the first insert and the second insert each comprise a polished transparent material having a surface variation of less than 3 percent;
   placing a light emitter on a surface of the first insert;
   placing a light receiver on a surface of the second insert;
   injecting, by the light emitter, light into the first insert; and
   receiving, by the light receiver, the light at the surface of the second insert.

2. The method of claim 1, wherein the light passes between the first insert and the second insert in a direction parallel to a major surface of the glass panel.

3. The method of claim 1, wherein forming the first insert comprises:
   forming a polished groove in the glass panel; and
   inserting the first insert into the polished groove.

4. The method of claim 1, wherein forming the first insert comprises molding the first insert into the glass panel during manufacture of the glass panel.

5. The method of claim 1, wherein an end of the first insert terminates within the glass panel at a depth of 10 to 90 percent a thickness of the glass panel.

6. The method of claim 1, wherein the light emitter defines a portion of a communication hub on the surface of the first insert and the light receiver defines a portion of a control object on the surface of the second insert.

7. The method of claim 6, wherein the control object comprises one or more of a camera, a display, a rain sensor, an air quality sensor, a driver monitor, a passenger monitor, and a microphone.

8. The method of claim 6, wherein the communication hub uses the glass panel as an optical communication layer to exchange data with the control object.

9. The method of claim 8, wherein the communication hub negotiates with the control object to communicate over the optical communication layer at a defined wavelength or frequency of light.

10. A system for using a glass panel of a vehicle as a high-speed optical interconnect, the system comprising:
    a polished groove formed in the glass panel;
    a first insert formed in a first region of the glass panel of the vehicle, wherein the first insert is positioned within the polished groove;
    a second insert formed in a second region of the glass panel of the vehicle;
    a light emitter positioned on a surface of the first insert, the light emitter configured to inject light into the first insert; and
    a light receiver positioned on a surface of the second insert, the light receiver configured to receive the light at the surface of the second insert.

11. The system of claim 10, wherein the light emitter and the light receiver are configured to pass the light between the first insert and the second insert in a direction parallel to a major surface of the glass panel.

12. The system of claim 11, wherein the first insert and the second insert each comprise a polished transparent material having a surface variation of less than 3 percent.

13. The system of claim 10, wherein the first insert and the glass panel comprise a monolithic structure molded together during manufacture of the glass panel.

14. The system of claim 10, wherein an end of the first insert terminates within the glass panel at a depth of 10 to 90 percent a thickness of the glass panel.

15. The system of claim 10, wherein the light emitter defines a portion of a communication hub on the surface of the first insert and the light receiver defines a portion of a control object on the surface of the second insert.

16. The system of claim 15, wherein the control object comprises one or more of a camera, a display, a rain sensor, an air quality sensor, a driver monitor, a passenger monitor, and a microphone.

17. The system of claim 15, wherein the communication hub is configured to use the glass panel as an optical communication layer to exchange data with the control object.

18. The system of claim 17, wherein the communication hub is configured to negotiate with the control object to communicate over the optical communication layer at a defined wavelength or frequency of light.

19. A system for using a glass panel of a vehicle as a high-speed optical interconnect, the system comprising:
    a first insert formed in a first region of the glass panel of the vehicle, wherein an end of the first insert terminates within the glass panel at a depth of 10 to 90 percent a thickness of the glass panel;

a second insert formed in a second region of the glass panel of the vehicle;
a light emitter positioned on a surface of the first insert, the light emitter configured to inject light into the first insert; and
a light receiver positioned on a surface of the second insert, the light receiver configured to receive the light at the surface of the second insert.

\* \* \* \* \*